（12）United States Patent
Yuasa

(10) Patent No.: US 8,276,078 B2
(45) Date of Patent: Sep. 25, 2012

(54) IMAGE DISPLAY APPARATUS AND IMAGE DISPLAY METHOD

(75) Inventor: Keiichiro Yuasa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 11/279,779

(22) Filed: Apr. 14, 2006

(65) Prior Publication Data

US 2006/0232695 A1 Oct. 19, 2006

(30) Foreign Application Priority Data

Apr. 18, 2005 (JP) ................................ 2005-120010

(51) Int. Cl.
G06F 3/033 (2006.01)

(52) U.S. Cl. ........ 715/732; 715/161; 715/734; 715/769; 348/143; 348/159; 348/207.99; 348/211.13; 348/333.01

(58) Field of Classification Search .................. 715/730, 715/732, 764, 769; 345/619, 333.01; 348/143, 348/159, 207.99, 211.13, 333.01
See application file for complete search history.

(56) References Cited

U.S. PATENT DOCUMENTS

| 4,847,604 | A | * | 7/1989 | Doyle | 345/180 |
| 5,640,522 | A | * | 6/1997 | Warrin | 715/732 |
| 6,510,520 | B1 | * | 1/2003 | Steinberg | 713/192 |
| 7,088,372 | B2 | * | 8/2006 | Yoshida | 345/589 |
| 7,215,367 | B2 | * | 5/2007 | Lee et al. | 348/231.99 |
| 7,254,682 | B1 | * | 8/2007 | Arbon | 711/161 |
| 7,262,763 | B2 | * | 8/2007 | Kinjo | 345/173 |
| 7,327,905 | B2 | * | 2/2008 | Tsue et al. | 382/305 |
| 7,483,084 | B2 | * | 1/2009 | Kawamura et al. | 348/687 |
| 2007/0019001 | A1 | * | 1/2007 | Ha | 345/619 |
| 2007/0216709 | A1 | * | 9/2007 | Kojima et al. | 345/619 |
| 2008/0252583 | A1 | * | 10/2008 | Sakashita et al. | 345/90 |
| 2009/0015600 | A1 | * | 1/2009 | Ouchi | 345/684 |

FOREIGN PATENT DOCUMENTS

| JP | 2000-354218 | 12/2000 |
| JP | 2001-069296 | 3/2001 |
| JP | 2002112165 A | 4/2002 |

* cited by examiner

Primary Examiner — Andrey Belousov
Assistant Examiner — Meseker Takele
(74) Attorney, Agent, or Firm — Fitzpatrick, Cella, Harper & Scinto

(57) ABSTRACT

An image display apparatus includes an image input unit which inputs an image from an image capturing device, a display control unit which displays an identification for identifying the input image or its input destination, and keeps the identification without canceling even when an operation is performed for another image after inputting the image, and a canceling unit which cancels the identification when a predetermined operation other than the operation for another image is performed.

7 Claims, 14 Drawing Sheets

IMAGE DISPLAY APPARATUS AND IMAGE DISPLAY METHOD

FIELD OF THE INVENTION

The present invention relates to an image display apparatus and image display method for displaying an image file and a folder for storing the image file.

BACKGROUND OF THE INVENTION

In recent years, a digital camera has become popular, and a user generally manages or uses a large amount of image data. For example, image files captured by a digital camera are input to a computer, classified, edited, appreciated, printed, used for a homepage, sent to his friend by E-mail, or used as a material for a document.

Conventionally, methods have been proposed to suppress redundant inputs of the same file when the image file is to be input from a digital camera and saved in a computer or the like (for example, see Japanese Patent Laid-Open Nos. 2000-354218 and 2001-069296).

Japanese Patent Laid-Open No. 2000-354218 discloses an additional scheme for canceling an image on an image capturing device side such as a digital camera upon inputting an image file to a computer or the like. Japanese Patent Laid-Open No. 2001-069296 discloses a scheme for placing a mark on an input image icon.

However, in the above-described conventional methods, when an image file is input to a computer or the like a plurality of number of times, or when the selected state of an image file changes even after inputting only once the image file for managing or using it, the input image file and its location cannot be determined on the computer side, thus posing a problem.

In contrast to this, it can be easily assumed to place a mark representing "unprocessed" on the icon of an image until the image file is managed or used after inputting the image. However, in this case, a user must reset the mark representing "unprocessed", and a user operation becomes more complex.

SUMMARY OF THE INVENTION

The present invention has been made in consideration of the above problems, and has as its object to provide an image display technique for easily determining a folder and image file which store input images, and assisting a user operation to manage or use the input images.

In order to solve the above problems and achieve the object, according to the present invention, there is provided an image display apparatus comprising an image input unit adapted to input an image from an image capturing device, a display control unit adapted to display an identification for identifying the input image or an input destination of the image, and keep the identification without canceling even when an operation is performed for another image after inputting the image, and a canceling unit adapted to cancel the identification when a predetermined operation other than the operation for the another image is performed.

According to the present invention, there is provided an image display method comprising an image input step of inputting an image from an image capturing device, a display control step of displaying an identification for identifying the input image or an input destination of the image, and keeping the identification without canceling even when an operation is performed for another image after inputting the image, and a canceling step of canceling the identification when a predetermined operation other than the operation for the another image is performed.

According to the present invention, an identification includes an identification mark and selected state display (coloring) (to be described later).

According to the present invention, since a folder and image file which store input images can be easily determined, a technique for assisting a user operation to manage or use the input images can be implemented.

Other objects and advantages besides those discussed above shall be apparent to those skilled in the art from the description of a preferred embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will now be described in detail with reference to the drawings.

It should be noted that embodiments to be described hereinafter are merely examples of implementation means of the present invention, and can be modified or changed in accordance with the arrangement and various conditions of the apparatus to which the present invention is applied. The present invention is not limited to the following embodiments.

[System Configuration]

Figure 1:
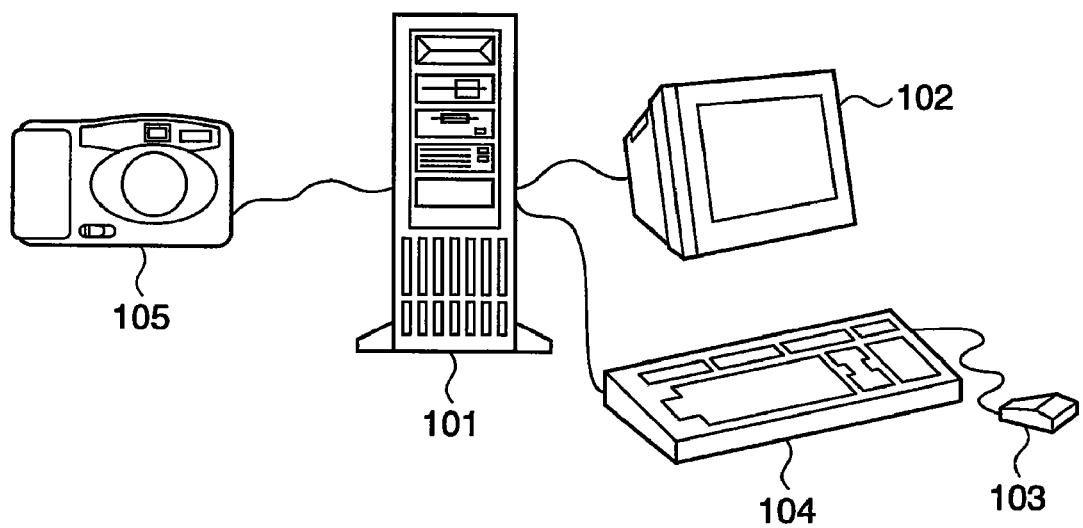
FIG. 1 is a view exemplifying a system including a digital camera and a computer system serving as a platform which can implement an image display apparatus according to an embodiment of the present invention.

FIG. 1 is a view exemplifying a system including a digital camera and a computer system serving as a platform which can implement an image display apparatus according to an embodiment of the present invention.

In FIG. 1, reference numeral 101 denotes a personal computer (PC) main body; 102, a display for displaying data; 103, a mouse serving as a typical pointing device; 104, a keyboard; and 105, a digital camera. For example, the PC main body 101 includes a CPU which controls the PC main body as a whole, a ROM storing a control program and various data executed by this CPU, a RAM for temporarily storing various types of control information, and a hard disk for storing an image file and the like.

In the system according to the embodiment, the PC main body 101 and the digital camera 105 are connected and communicable with each other via a USB interface.

Figure 2:
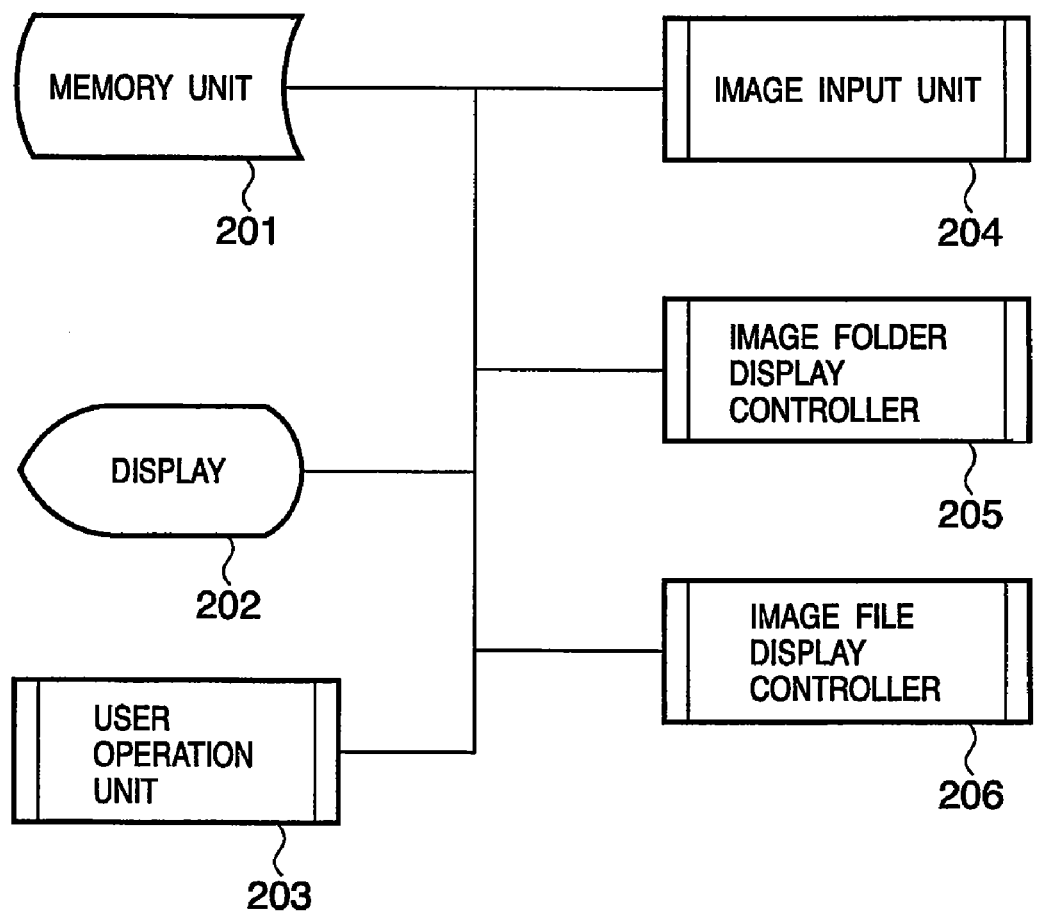
FIG. 2 is a block diagram showing the overall arrangement of the image display apparatus according to the embodiment of the present invention.

FIG. 2 is a block diagram showing the overall arrangement of the image display apparatus according to the embodiment of the present invention.

In FIG. 2, reference numeral 201 denotes a memory unit such as a memory which stores an image file, a folder for storing the image file, and control information of the apparatus. In the embodiment, the memory unit 201 is mounted in the PC main body 101 shown in FIG. 1. However, the memory unit 201 may be included in another apparatus connected to the PC main body via a network or the like.

Reference numeral 203 denotes a user operation unit used when a user is to operate this apparatus. In accordance with a user operation, the user operation unit 203 controls a user interface to read out an image or image folder from the memory unit 201, display the readout image or image folder on a display 202, and display an operation menu for starting an image input process (to be described later).

Reference numeral 204 denotes an image input unit which inputs an image from the digital camera 105. The image input unit 204 starts based on an instruction from the user operation unit 203 in accordance with the user operation, and inputs an image file from the digital camera 105 to the memory unit 201. An image folder immediately after the input process, in which the image file is written in the memory unit 201 in the input process, and a previous input image file are displayed in selected states. For example, such a state is represented by adding (coloring) a color to a background area or near the outer frame of the selected folder or file, as denoted by reference numerals 306 and 305 shown in FIG. 3.

Reference numeral 205 denotes an image folder display controller which displays the image folder stored in the memory unit 201. The image folder display controller 205 displays, in a tree structure, the image folders hierarchically arranged on the PC main body 101. The image folder display controller 205 starts based on an instruction from the user operation unit 203 in accordance with a user operation, controls parent/child display in the tree structure, and controls to change the display location of a current folder.

Reference numeral 206 denotes an image file display controller which displays the image file stored in the memory unit 201. The image file display controller 206 displays the list of image files in a current folder of the image folders hierarchically arranged on the PC main body 101. The image file display controller 206 starts based on an instruction from the user operation unit 203 in accordance with a user operation, displays a thumbnail image of the image itself, and displays the structure of lower folders.

Each element in the above-described system is widely used in a known computer system or an image management system.

[Specific Functions of Embodiments]

In the embodiments, the functions of the user operation unit 203, image folder display controller 205, and image file display controller 206 in the above-described system are improved, and the present invention can exhibit a new effect which is not included in the prior art. The embodiments will be described below in detail.

First Embodiment

Figure 5:
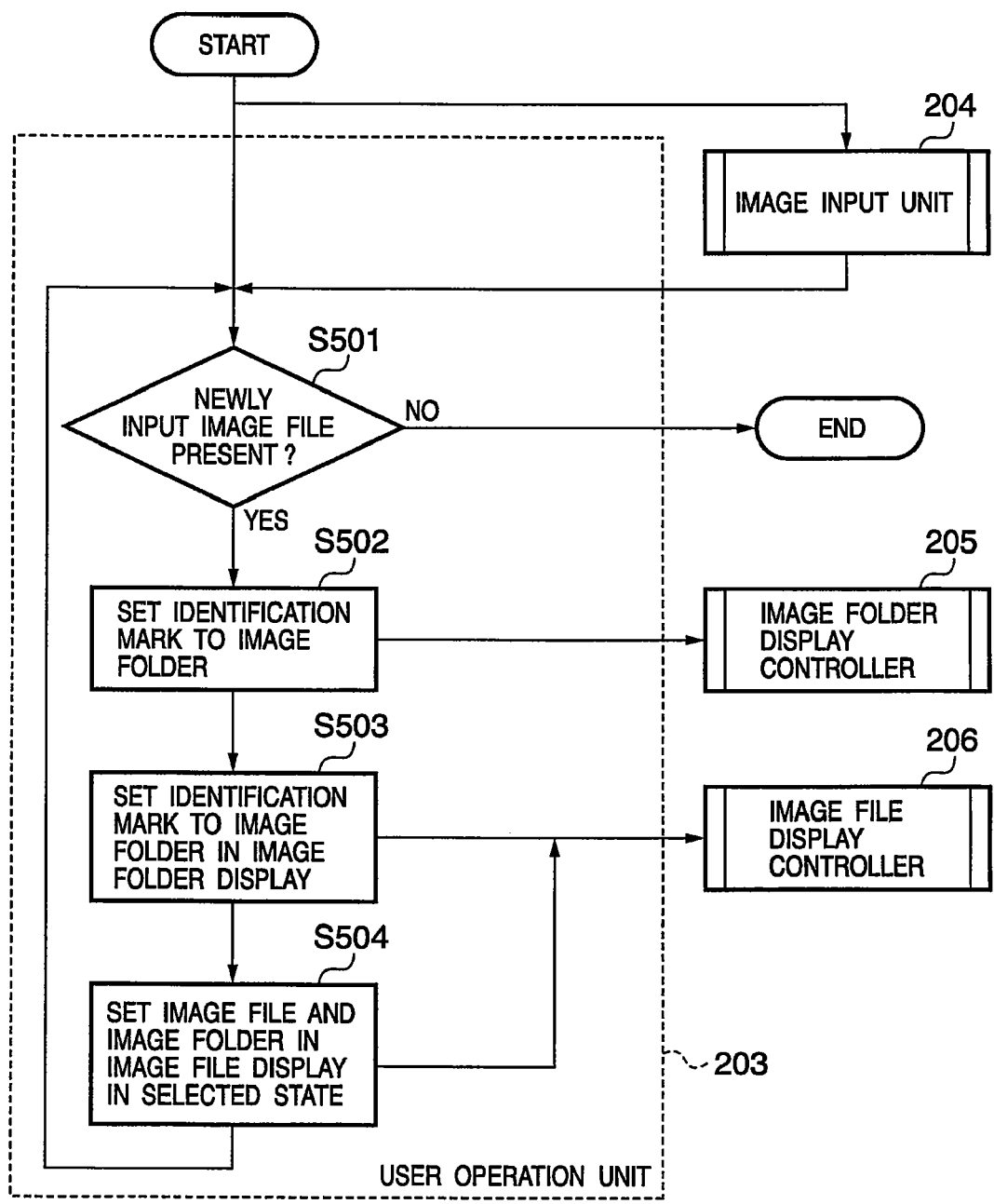
FIG. 5 is a flowchart showing an identification mark setting process performed by a user operation unit in the image input process according to the first embodiment.

FIG. 5 is a flowchart showing an identification mark setting process performed by a user operation unit in an image input process according to the first embodiment. The image input process is performed by an image input unit 204 shown in FIG. 2. After the image input process, processes (steps S501 to S503) newly added in this embodiment and an existing process (step S504) are performed.

Figure 3:
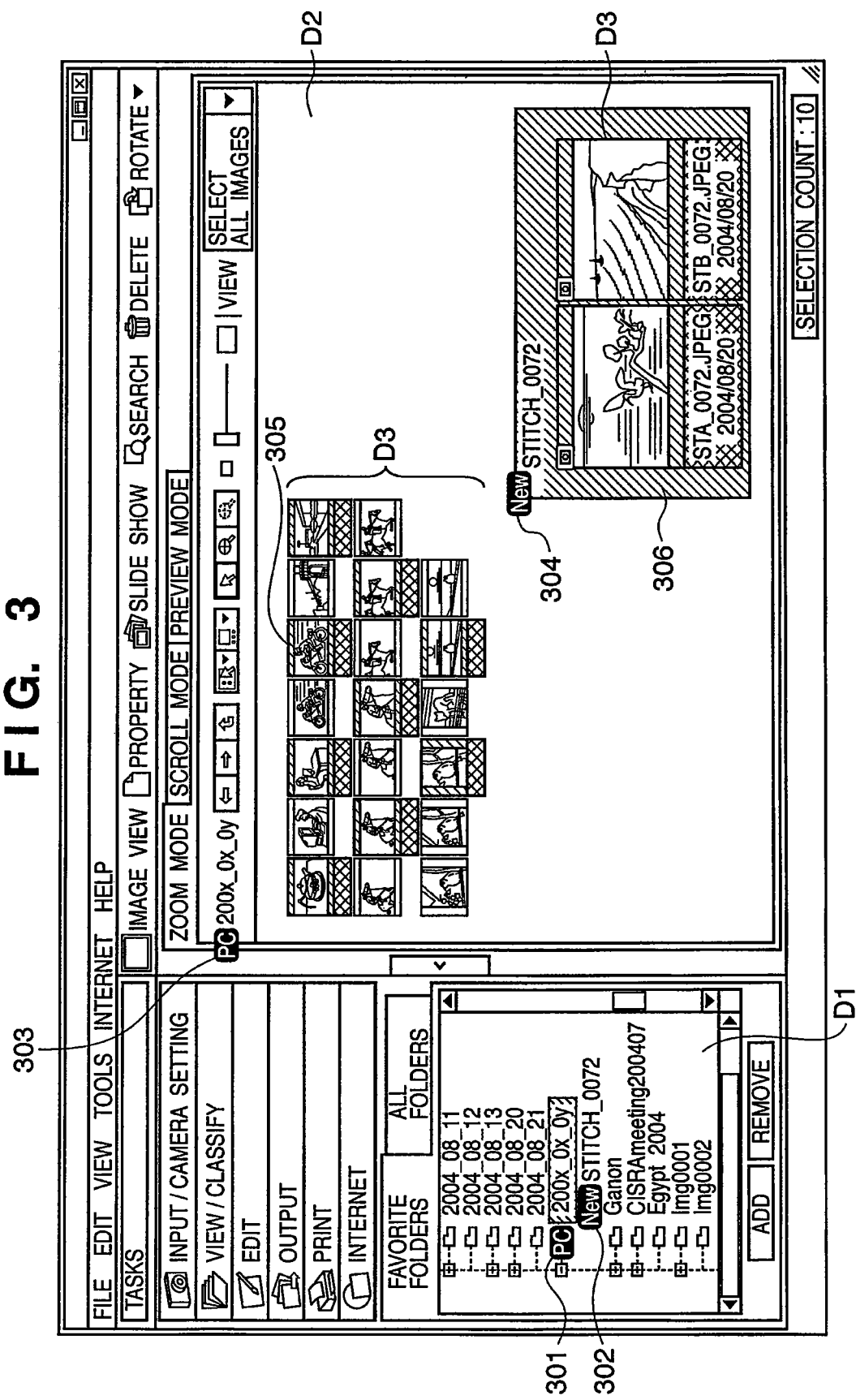
FIG. 3 is a view exemplifying a display window on a display immediately after an image input process according to the first, second, and fourth embodiments.

More specifically, if it is determined in step S501 that a new image file is input (YES), the flow shifts to step S502. In this step, identification marks such as marks 301 and 302 in FIG. 3 representing a new image input are set to the icons of the image file and folder in a folder tree display D1 on a display 202. In step S502, the display content in the folder tree display D1 can be rewritten only by instructing an image folder display controller 205 to display the marks.

In step S503 after step S502, in a folder display D2 on the display 202, identification marks such as marks 303 and 304 representing the new image input are set to the icon of an image folder displayed as a currently uppermost folder and a lower image folder. In step S503, the display content in the folder display D2 can be rewritten only by instructing an image file display controller 206 to display the marks.

In step S504 after step S503, as denoted by reference numerals 305 and 306 in FIG. 3, an image file which is newly input in the currently uppermost image folder, an image folder which serves as the lower image folder and includes the newly input image file, and an image file which is newly input in the image folder are set in selected states in an image file display D3 on the display 202. In step S504, the display content in the image file display D3 can be rewritten only by instructing the image file display controller 206 to perform selected state display (identifiably coloring).

The flow returns to step S501 after step S504. If there is no newly input image (NO), the process ends.

In the above-described process, as in FIG. 3, the display state on the display 202 is as follows.

(1-1) In the folder tree display D1, the identification marks such as the marks 301 and 302 representing an image input are displayed on the icon of the image folder in which the image file is newly input.

(1-2) In the image folder display D2, the identification marks such as the marks 303 and 304 representing the image input are displayed on the icon of the currently uppermost folder and the lower folder.

(1-3) In the image file display D3, as denoted by reference numerals 305 and 306, the selected states of the newly input image file and the folder in which the newly input image file is stored are displayed by coloring the currently uppermost folder and the lower folder.

Figure 4:
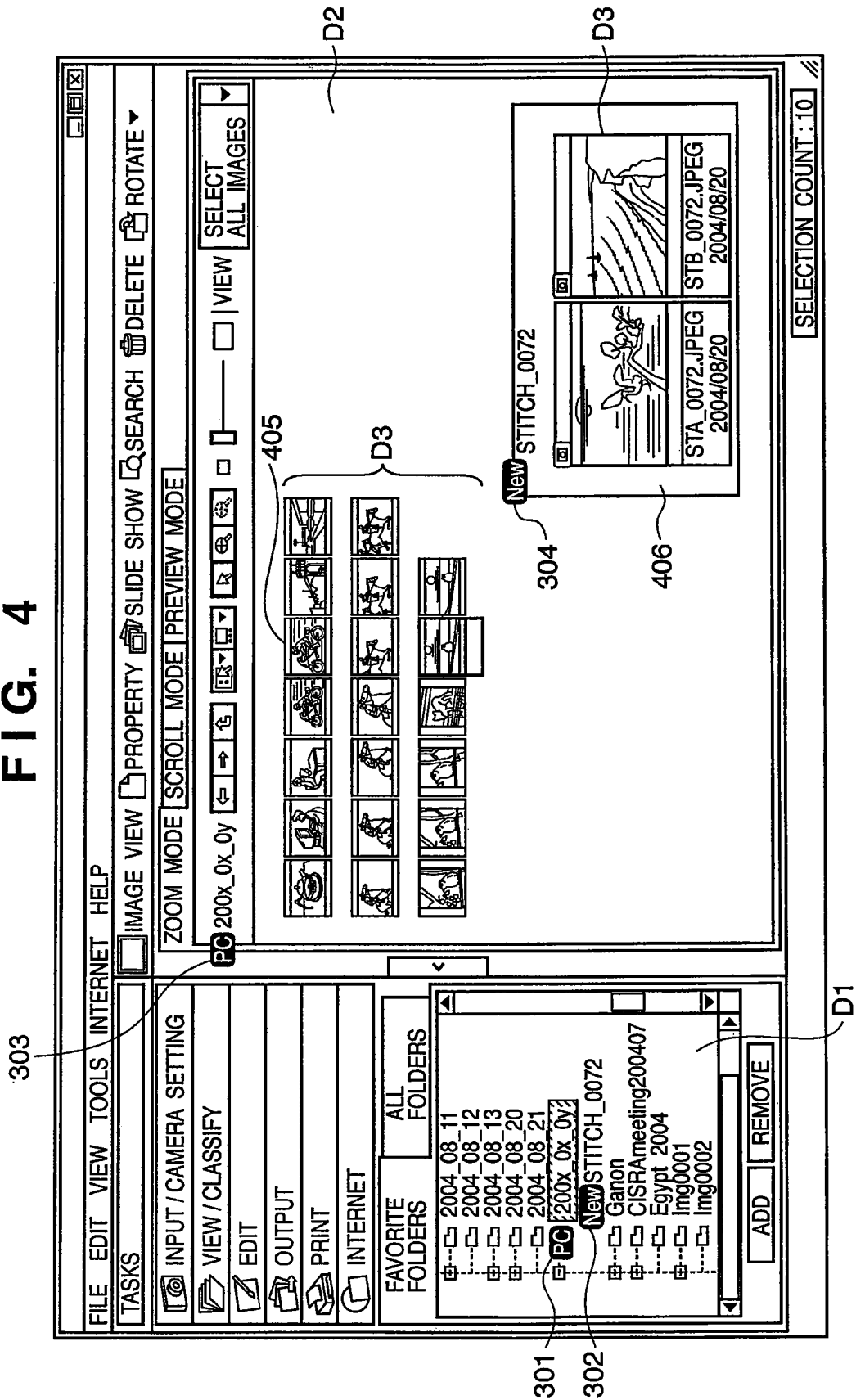
FIG. 4 is a view exemplifying a display window on the display upon a user operation after the image input process according to the first, second, and fourth embodiments.

Note that when a user operation is performed on this system, e.g., when a certain image file is operated in detail, the selected state of the image changes, and only this selected image changes to be in the selected state. In this case, as shown in FIG. 4, even if the display position of the currently uppermost folder does not change from the position in FIG. 3, the display state on the display 202 is as follows.

(1-4) In the folder tree display D1, the identification marks such as the marks 301 and 302 representing the image input are left without being canceled from the icon of the image folder in which the image file is newly input.

(1-5) In the image folder display D2, the identification marks such as the marks 303 and 304 representing the image input are left without being canceled from the icon of the currently uppermost folder and the lower folder.

(1-6) In the image file display D3, as denoted by reference numerals 405 and 406, the identification marks representing the selected states of the newly input image file and the folder in which the newly input image file is stored are canceled from the icon of the currently uppermost folder and the lower folder.

Furthermore, when the system is temporarily ended and rebooted by a user operation, a processing flow in FIG. 5 is not executed because it is an operation for performing the image input process. The identification marks such as the marks 301 to 304 representing the past image input are automatically canceled.

Note that in the first embodiment, there is no visual difference between the marks 301 and 302 and the marks 303 and 304 shown in FIG. 3 or 4.

The processing order of steps S502, S503, and S504 in FIG. 5 can also change. Even in this case, the operation of each unit does not change.

Second Embodiment

Figure 6:
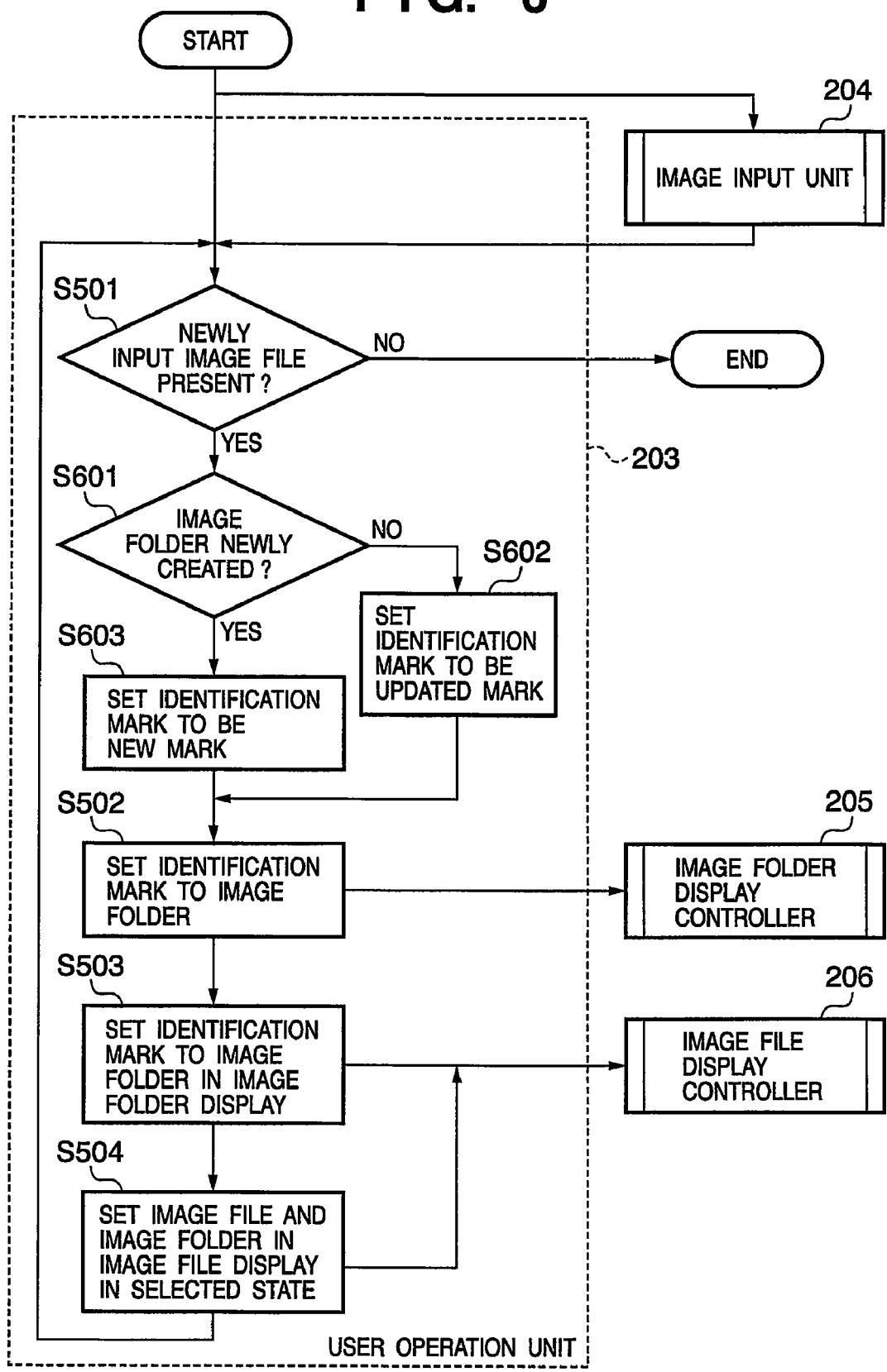
FIG. 6 is a flowchart showing an identification mark setting process performed by a user operation unit in an image input process according to the second embodiment.

FIG. 6 is a flowchart showing an identification mark setting process performed by a user operation unit in an image input process according to the second embodiment. The image input process is executed by an image input unit 204 shown in FIG. 2. Among the processes (steps S501 to S503) in the first embodiment, processes (steps S601 to S603) as the characteristic feature of the second embodiment are executed after the image input process.

More specifically, in step S601, it is determined whether an image folder which saves a newly input image file is a folder which is newly created in this image input process. This determination can be implemented by determining whether the time stamp of a file or folder generated in a general computer file system matches that of the image folder. If the determination result represents matching (YES) in step S601, the identification mark for the image folder is set to be a new mark in step S603. If the determination result represents mismatching (NO) in step S601, the identification mark for the image folder is set to be an updated mark in step S602.

The remaining processes are the same as those in the first embodiment, and a description thereof will be omitted.

In the above-described process, as in FIG. 3, the display state on a display 202 is as follows.

(2-1) In a folder tree display D1, identification marks are discriminatively displayed. For example, a mark 301 is displayed when an image file is added to an existing image folder, and a mark 302 is displayed when the image file is added to a newly created image folder.

(2-2) In a folder display D2, identification marks are discriminatively displayed on the currently uppermost folder and the lower folder. For example, a mark 303 is displayed when an image file is added to an existing image folder, and a mark 304 is displayed when the image file is added to a newly created image folder.

(2-3) In the image file display D3, as denoted by reference numerals 305 and 306, the selected states of the newly input image file and the folder in which the newly input image file is stored are displayed by coloring the currently uppermost folder and the lower folder.

Note that when a user operation is performed on this system, e.g., when a certain image file is operated in detail, the selected state of the image changes, and only this selected image changes to be in the selected state. In this case, as shown in FIG. 4, even if the display position of the currently uppermost folder does not change from the position in FIG. 3, the display state on the display 202 is as follows.

(2-4) In the folder tree display D1, the identification marks such as the marks 301 and 302 representing the image input are left without being canceled from the icon of the image folder in which the image file is newly input.

(2-5) In the image folder display D2, the identification marks such as the marks 303 and 304 representing the image input are left without being canceled from the icons of the currently uppermost folder and the lower folder.

(2-6) In the image file display D3, as denoted by reference numerals 405 and 406, the identification marks representing the selected states of the newly input image file and the folder in which the newly input image file is stored are canceled from the icons of the currently uppermost folder and the lower folder.

Furthermore, when the system is temporarily ended and rebooted by a user operation, a processing flow in FIG. 5 is not executed because it is an operation for performing the image input process. The identification marks such as the marks 301 to 304 representing the past image input are automatically canceled.

Third Embodiment

Figure 7:
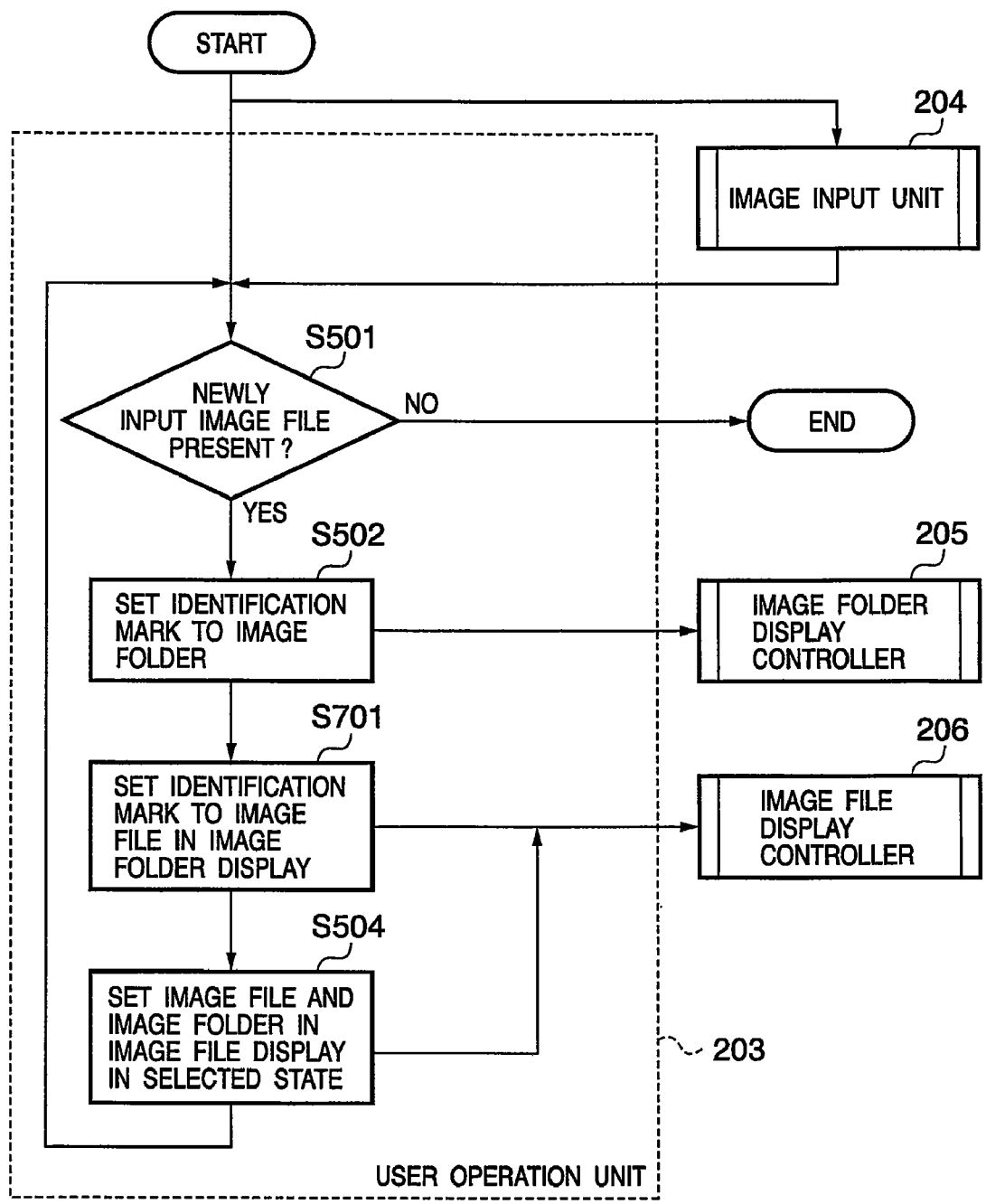
FIG. 7 is a flowchart showing an identification mark setting process performed by a user operation unit in an image input process according to the third embodiment.

FIG. 7 is a flowchart showing an identification mark setting process performed by a user operation unit in an image input process according to the third embodiment. The image input process is executed by an image input unit 204 shown in FIG. 2. In place of the process in step S503 in the first embodiment, a process (step S701) as the characteristic feature of the third embodiment is executed after the image input process.

Figure 8:
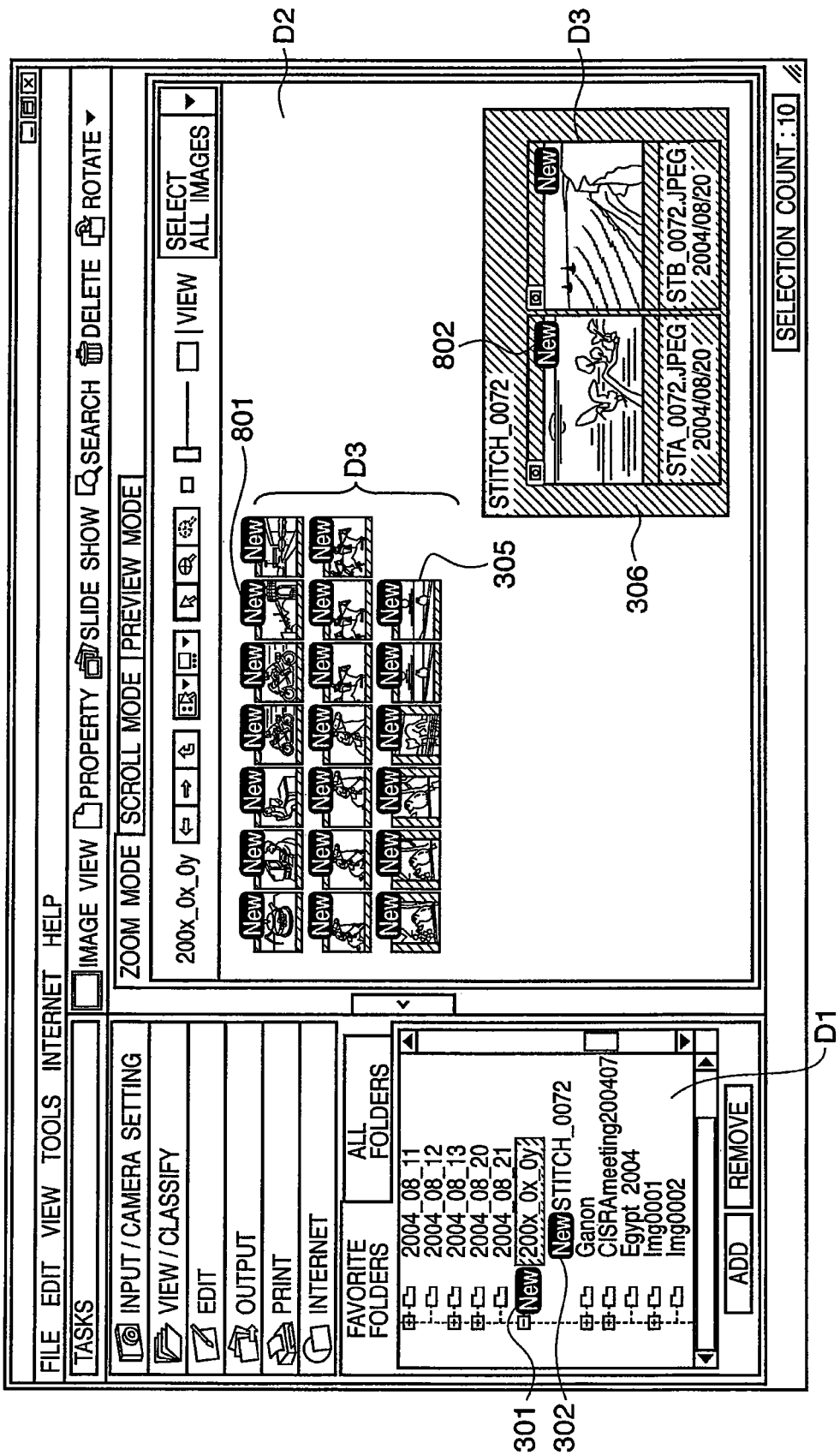
FIG. 8 is a view exemplifying a display window on a display immediately after an image input process according to the third embodiment.

More specifically, in step S701, in an image file display D3 on a display 202, identification marks such as marks 801 and 802 in FIG. 8 representing new inputs are set to image files newly input in the currently uppermost folder and the lower folder. In step S701, the display content in the image file display D3 can be rewritten only by instructing an image file display controller 206 to display the marks.

The remaining processes are the same as those in the first embodiment, and a description thereof will be omitted.

In the above-described process, as in FIG. 8, the display state on a display 202 is as follows.

(3-1) In a folder tree display D1, the identification marks such as marks 301 and 302 representing an image input are displayed on the icon of the image folder in which the image file is newly input.

(3-2) In an image folder display D2, the identification marks 801 and 802 representing the new image input are displayed on the icons of the newly input image file and the image file newly input in the lower folder.

(3-3) In the image file display D3, as denoted by reference numerals 305 and 306, the selected states of the newly input image file and the folder in which the newly input image file is stored are displayed by coloring the currently uppermost folder and the lower folder.

Figure 9:
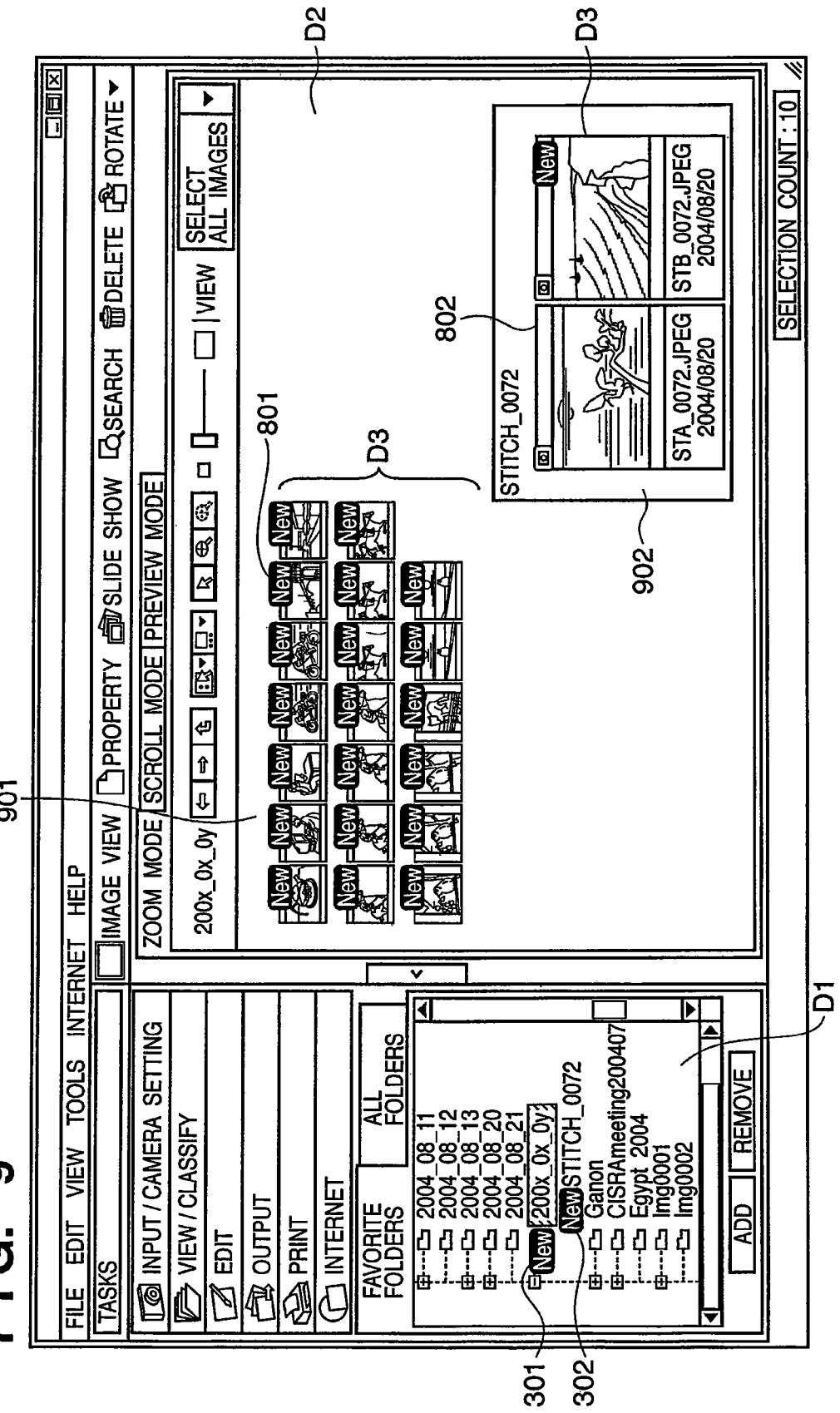
FIG. 9 is a view exemplifying a display window on the display upon a user operation after the image input process according to the third embodiment.

Note that when a user operation is performed on this system, e.g., when a certain image file is operated in detail, the selected state of the image changes, and only this selected image changes to be in the selected state. In this case, as shown in FIG. 9, even if the display position of the currently uppermost folder does not change from the position in FIG. 8, the display state on the display 202 is as follows.

(3-4) In the folder tree display D1, the identification marks such as the marks 301 and 302 representing the image input are left without being canceled from the icon of the image folder in which the image file is newly input.

(3-5) In the image folder display D2, the identification marks such as the marks 801 and 802 representing the image input are left without being canceled from the icons of the image files input in the currently uppermost folder and the lower folder.

(3-6) In the image file display D3, as denoted by reference numerals 901 and 902, the identification marks representing the selected states of the newly input image file and the folder in which the newly input image file is stored are canceled from the icons of the currently uppermost folder and the lower folder.

Furthermore, when the system is temporarily ended and rebooted by a user operation, a processing flow in FIG. 7 is not executed because it is an operation for performing the image input process. The identifications such as the marks 301, 302, 801, and 802 representing the past image input are automatically canceled.

Note that in the third embodiment, there is no visual difference between the marks 301 and 302 in FIG. 8 or 9. However, the marks 301 and 302 may be discriminatively displayed for representing a new folder and an updated folder as in the second embodiment, by adding the processes in steps S601 to S603 in the second embodiment to the processing flow shown in FIG. 7.

Fourth Embodiment

Figure 10:
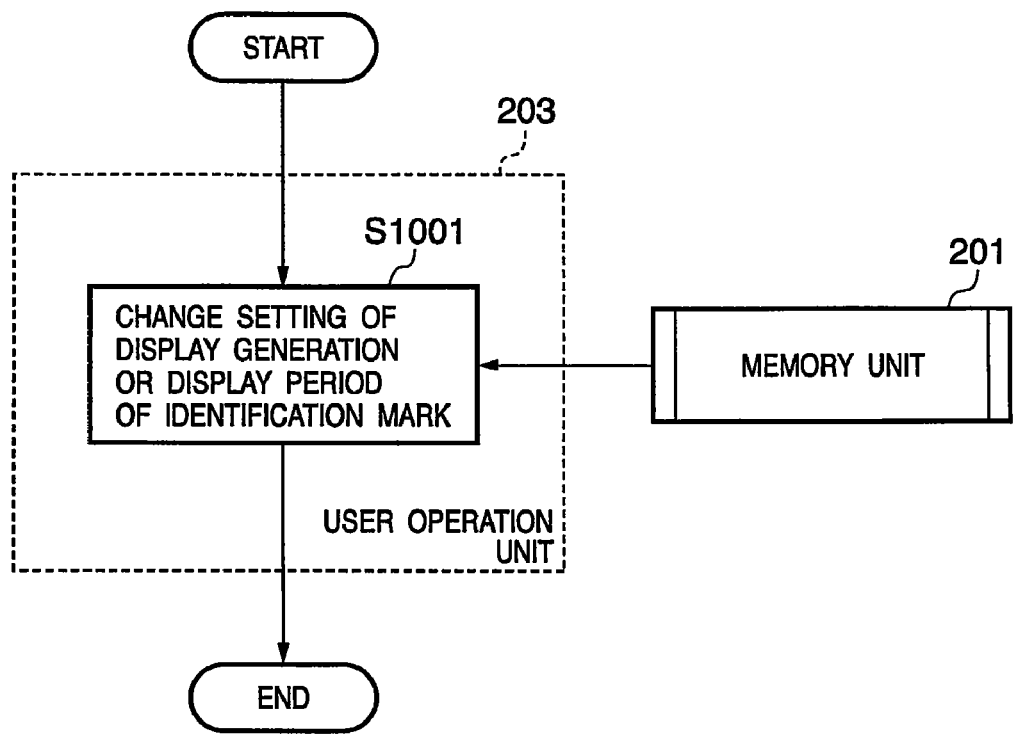
FIG. 10 is a flowchart showing the setting process of a display generation or display period of an image input mark in the user operation unit.

FIG. 10 is a flowchart showing the setting process of a display generation or display period of an image input mark in the user operation unit. Note that as shown in FIGS. 13 and 14, in accordance with the display generation, mark display time-serially changes in descending order in an image input process.

More specifically, in step S1001, a user operation unit 203 instructs a memory unit 201 to change the display generation or display period of the identification mark. The initial value of the display generation or display period of the identification mark is read out from the memory unit 201. The obtained value is changed, and the updated value is stored again.

Figure 13:
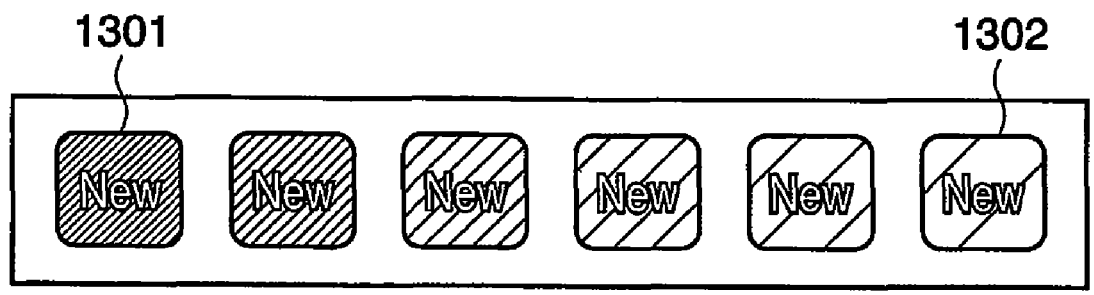
FIG. 13 is a view showing a display example of a mark group used to display the marks while changing the color density of the marks in accordance with a display generation or display period in the image input process according to the fourth embodiment.
Figure 14:
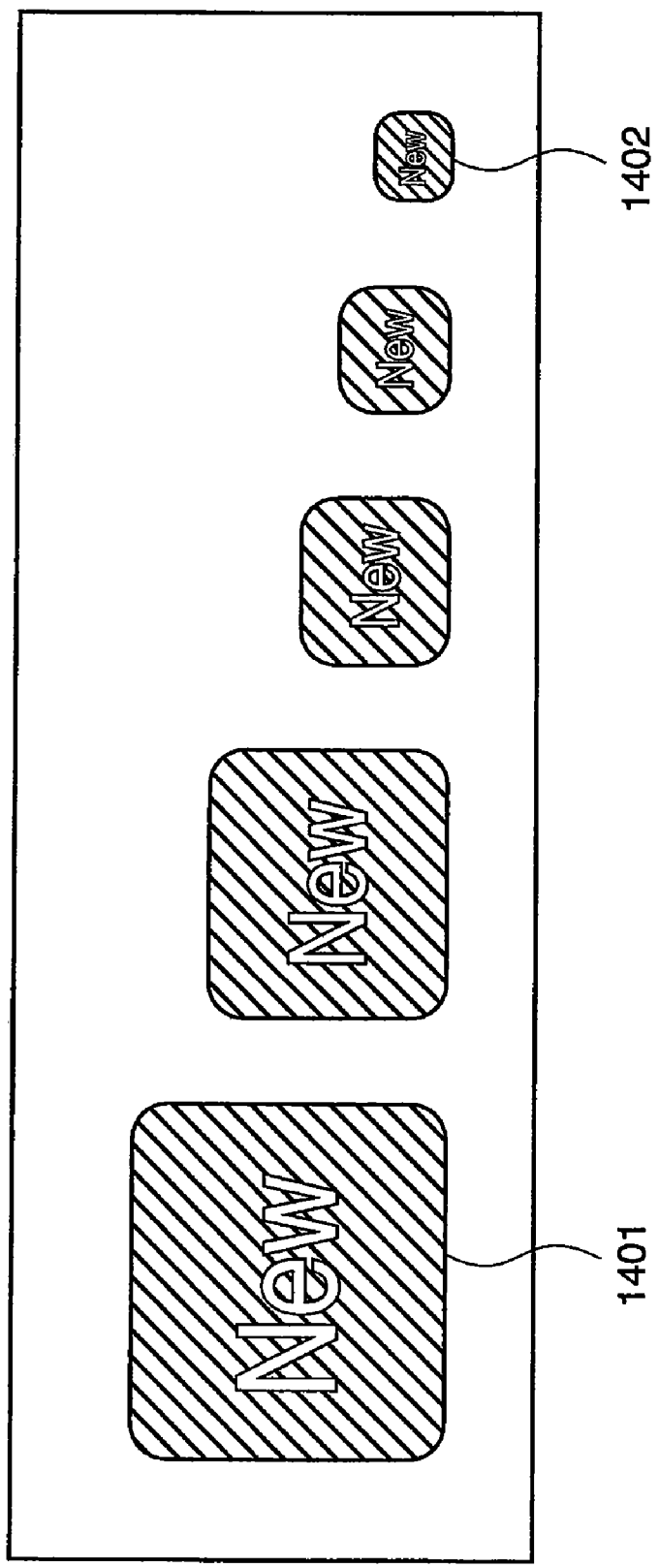
FIG. 14 is a view showing a display example of a mark group used to display the marks while changing the size of the marks in accordance with the display generation or display period in the image input process according to the fourth embodiment.

In the fourth embodiment, in accordance with the display generation (the ordinal position of the image input process from the latest image input process) or display period (the elapsed time after the image input process), identification marks can be displayed by changing the color density as shown in FIG. 13, or changing the size as shown in FIG. 14.

When the color density of the identification mark is to be changed as shown in FIG. 13, a dark color identification mark 1301 is displayed on the icon of an input image obtained at latest or later time, and a light color identification mark 1302 is displayed on the icon of an input image obtained at earliest or earlier time. No identification mark is displayed on the icon of an input image obtained earlier than when inputting the image with the identification mark 1302.

When the size of the identification mark is to be changed as shown in FIG. 14, a large identification mark 1401 is displayed on the icon of an input image obtained at latest or later time, and a small identification mark 1402 is displayed on the icon of an input image obtained at earliest or earlier time. No identification mark is displayed on the icon of an input image obtained earlier than when inputting the image with the identification mark 1402.

Figure 11:
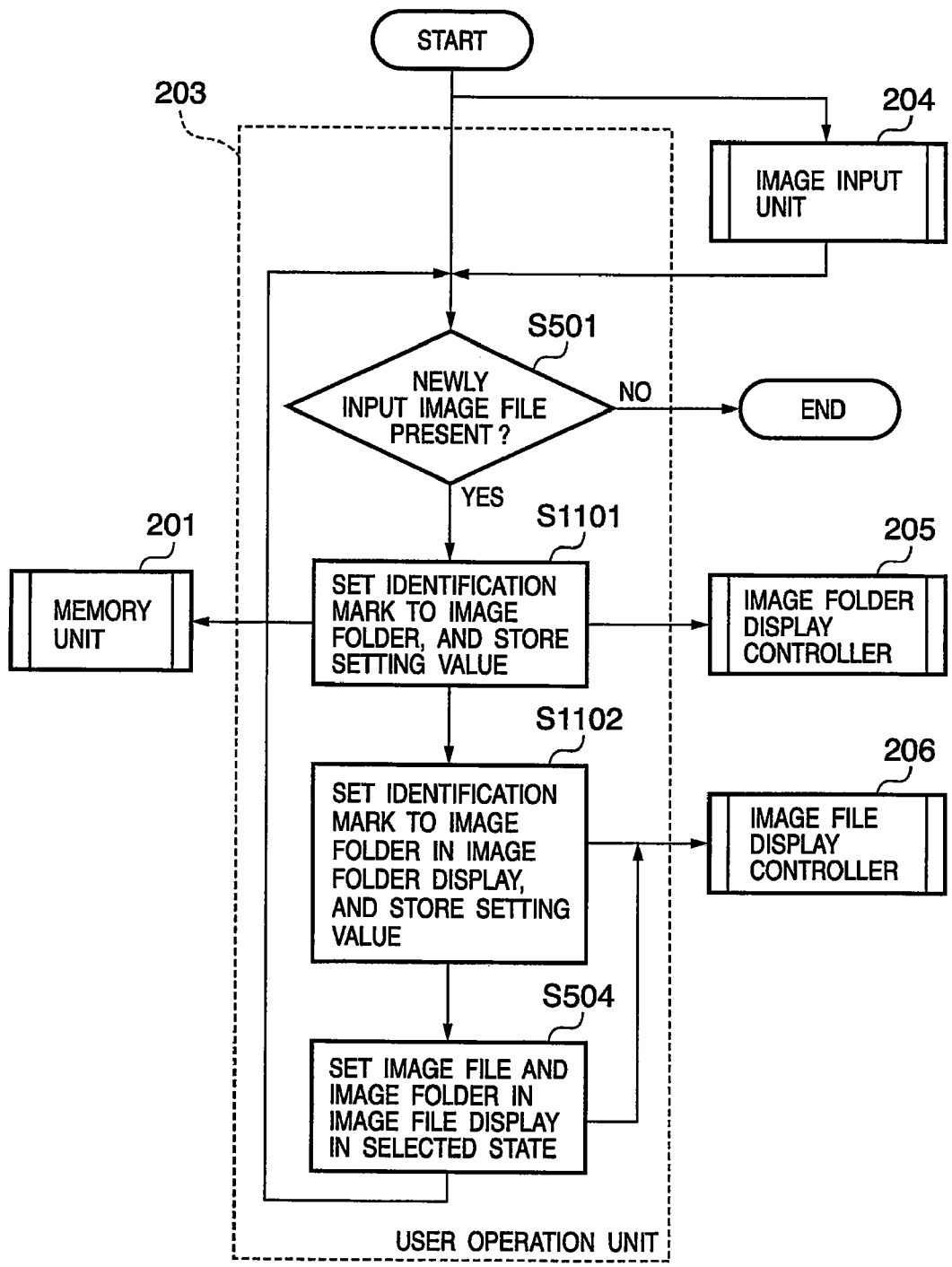
FIG. 11 is a flowchart showing an identification mark setting process performed by a user operation unit in an image input process according to the fourth embodiment.

FIG. 11 is a flowchart showing an identification mark setting process performed by the user operation unit in the image input process according to the fourth embodiment. The image input process is executed by an image input unit 204 shown in FIG. 2, and processes (steps S1101 and S1102) as characteristic features of the fourth embodiment are executed in place of the processes in steps S502 and S503 described in the first embodiment.

More specifically, in step S1101, identification marks such as marks 301 and 302 in FIG. 3 representing a new image input are set to the icons of the image file and image folder in a folder tree display D1 on the display 202. The setting value is stored in the memory unit 201. In step S1101, the display content in the folder tree display D1 can be rewritten only by instructing an image folder display controller 205 to display the marks.

Since the current operation is the latest image file input process based on a user operation, the identification mark is displayed, in step S1101, on the icon of the folder in which the latest image file is input. That is, the identification mark 1301 in FIG. 13 or the identification mark 1401 in FIG. 14 is displayed. In step S1101, the name of the folder which stores the input image, and the time at which the image input process was performed are stored in the memory unit 201, as image input information together with the setting value.

In step S1102 after step S1101, in a folder display D2 on the display 202, identification marks such as marks 303 and 304 in FIG. 3 representing a new image input are set to the icons of the image folders displayed as the currently uppermost folder, and the lower image folder. In step S1102, the display content in the folder display D2 can be rewritten only by instructing an image file display controller 206 to display the marks.

Since the current operation is the latest image file input process based on the user operation, the identification mark set in step S1102 is displayed on the icon of the folder in which the latest image file is input. That is, the mark 1301 in FIG. 13 or the mark 1401 in FIG. 14 is displayed.

In the above-described process, as in FIG. 3 in the first embodiment, the display state on the display 202 is as follows.

(4-1) In the folder tree display D1, an identification mark 1301 or 1401 is displayed at the positions of the marks 301 and 302 on the icon of the image folder in which the image file is newly input.

(4-2) In the image folder display D2, an identification mark 1301 or 1401 is also displayed at the positions of the marks 303 and 304 on the icons of the currently uppermost folder and the lower folder.

(4-3) In an image file display D3, as denoted by reference numerals 305 and 306, the selected states of the newly input image file and the folder in which the new image file is present are displayed by coloring the currently uppermost folder and the lower folder.

Note that when a user operation is performed on this system, e.g., when a certain image file is operated in detail, the selected state of the image changes, and only this selected image changes to be in the selected state. In this case, as in FIG. 4 in the first embodiment, even if the display position of the currently uppermost folder does not change from the position in FIG. 3, the display state on the display 202 is as follows.

(4-4) In the folder tree display D1, the identification mark 1301 (in FIG. 13) or 1401 (in FIG. 14) is left at the positions of the marks 301 and 302 without being canceled from the icon of the image folder in which the image file is newly input.

(4-5) In the image folder display D2, the identification mark 1301 (in FIG. 13) or 1401 (in FIG. 14) is left at the positions of the marks 303 and 304 of the image folder of a newly input image without being canceled from the icons of the currently uppermost folder and the lower folder.

(4-6) In the image file display D3, as denoted by reference numerals 405 and 406, the identification marks representing the selected states of the newly input image file and the folder in which the newly input image file is stored are canceled from the icons of the currently uppermost folder and the lower folder.

Figure 12:
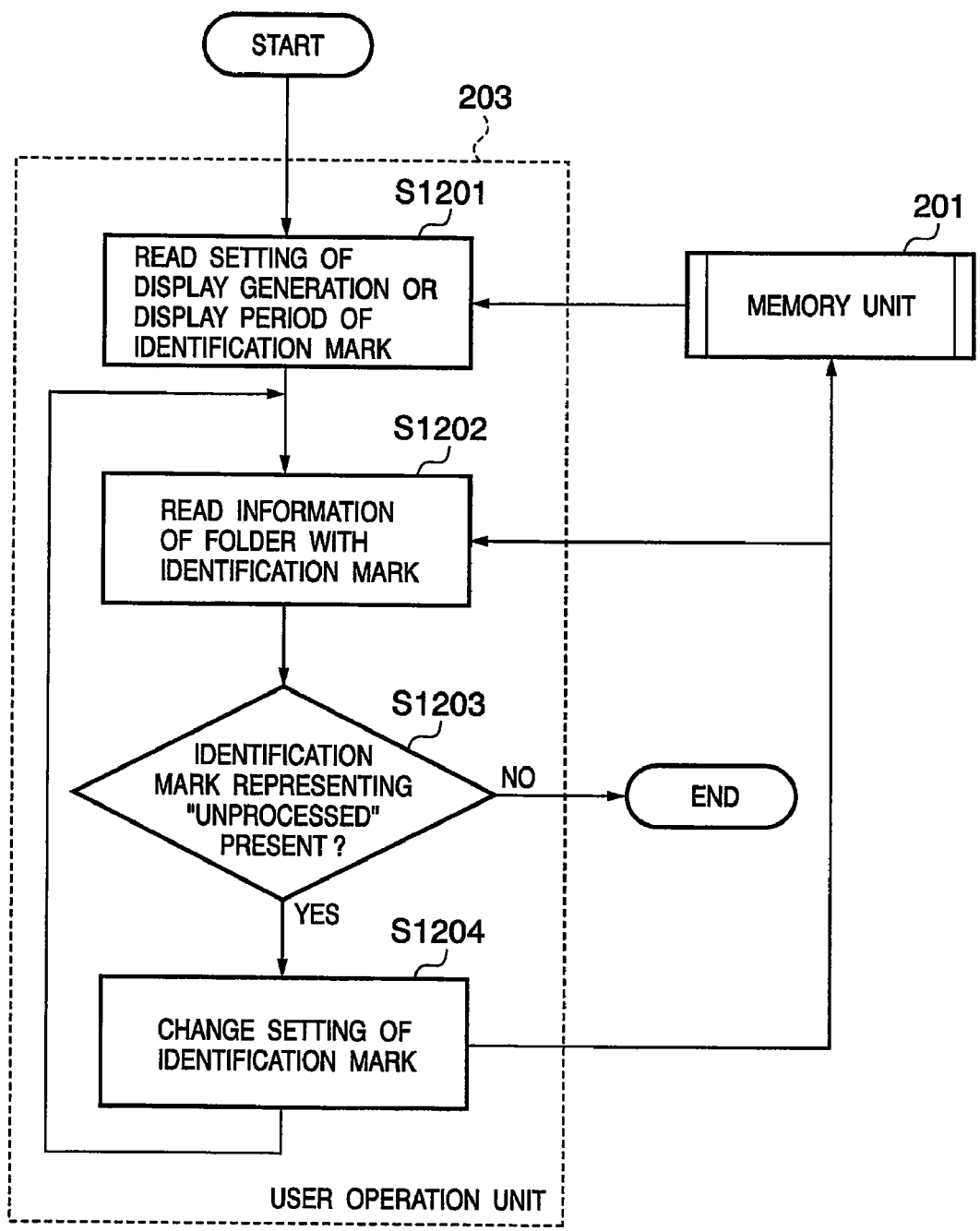
FIG. 12 is a flowchart showing an update process and display process of a mark in the user operation unit after the image input process or reboot process according to the fourth embodiment.

Furthermore, in the fourth embodiment, when the system is temporarily ended and rebooted by a user operation, or after the image input process is executed again by a user operation, the processing flow shown in FIG. 12 is executed.

FIG. 12 is a flowchart showing an update process and display process of a mark in the user operation unit after the image input process or reboot process according to the fourth embodiment.

In step S1201 in FIG. 12, the user operation unit reads out the setting value of the display generation or display period of an identification mark which is set in step S1001 in FIG. 10 and stored in the memory unit 201.

Sequentially, in step S1202, the user operation unit reads out, from the memory unit 201, the information (the name of a folder in which the image is input, and the time of the image input process) of the folder of the identification mark in step S1201, in descending order together with information of the folder whose identification mark is unupdated.

Sequentially, in step S1203, it is determined whether the identification mark representing "unprocessed" is present in step S1202. If the identification mark representing "unprocessed" is not found (NO), the process ends because there is no identification mark representing "unprocessed". If the identification mark representing "unprocessed" is present (YES), the flow shifts to step S1204. In this step, in accordance with the setting value of the display generation or display period of the identification mark read out in step S1202, the type of the identification mark representing "unprocessed" read out in step S1202 changes to one of the types of the marks shown in FIGS. 13 and 14. If the image is obtained at earlier time than the earliest display generation or display period, the folder information stored in the memory unit 201 is deleted.

For example, assume that the identification mark changes within a range of six color densities as in FIG. 13 corresponding to six display generations set in step S1001 in FIG. 10. The identification mark 1301 is set to the icon of the image folder in which the latest image input process is performed, and the identification mark 1302 is set to the icon of the image folder in which the fifth preceding image input process from the latest image input process is performed. The identification mark of the image folder of the sixth or more preceding image input process is canceled to delete the folder information from the memory unit 201.

In the process shown in FIG. 12, without any explicit operation by a user, the display state of the identification mark for identifiably displaying the image folder in which the image input process is performed automatically changes in accordance with the ordinal position of image input process or the elapsed time after the input process. The identification mark is finally canceled.

Note that the process in FIG. 10 can be omitted when an initial setting value is fixed to prevent the user from changing the setting value.

In FIG. 13, the dark color identification mark represents the latest or later image folder, and the identification mark changes in the range of six color densities. However, the ordinal position and the number of colors may be changed. The display scheme may be implemented by using color brightness or tint, in addition to color density.

In FIG. 14, the largest identification mark represents the latest or later image folder, and the identification mark changes in a range of five generations. However, the ordinal position and the number of sizes may be changed. The display scheme may be implemented by changing designs, e.g., the number of stars representing the degree of importance.

In the flowcharts in FIGS. 11 and 12, in step S1101, the memory unit 201 stores the name of the folder in which the image is input, and the time of the image input process. However, this process may be performed in step S1102.

Note that in the fourth embodiment, there is no visual difference between the marks 301 and 302 in FIGS. 3 and 4, and marks 1401 and 1402 in FIG. 14. However, the marks 301 and 302 may be discriminatively displayed for representing a new folder and an updated folder as in the second embodiment, by adding the processes in steps S601 to S603 in the second embodiment to the processing flow shown in FIG. 11, and preparing the designs of the marks for the new folder and the updated folder as shown in FIGS. 13 and 14.

Other Embodiment

As described above, the embodiments of the present invention are described in detail with concrete examples. The present invention may include an aspect such as a system, apparatus, method, program, or storage medium (or recording medium). More specifically, the present invention may be applied to a system constituted by a plurality of devices or an apparatus comprising a single device.

The present invention is also achieved even by supplying a software program (in the embodiments, a program corresponding to the flowcharts shown in FIGS. 5 to 7 and FIGS. 10 to 12) which implements the functions of the above-described embodiments to the system or apparatus directly or from a remote site and causing the computer of the system or apparatus to read out and execute the supplied program code.

Hence, to implement the functional processing of the present invention by a computer, the program code itself, which is installed in the computer, also implements the present invention. That is, a computer program itself, which implements the functional processing of the present invention, is also incorporated in the claim of the present invention.

In this case, the program can take any form such as an object code, a program to be executed by an interpreter, or script data to be supplied to the OS as long as the functions of the program can be obtained.

As a recording medium (storage medium) to supply the program, for example, a floppy (registered trademark) disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet using a browser in the computer, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the claim of the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program using the key information, and install the program in the computer.

The functions of the above-described embodiments are implemented not only when the readout program is executed by the computer but also when the OS or the like, which is running on the computer, performs part or all of actual processing on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-120010, filed Apr. 18, 2005, which is hereby incorporated by reference herein in its entirety.

What is claimed is:

1. An image display apparatus comprising:
at least a processor and memory, said processor and memory functioning as:
an image input unit adapted to input a first image by receiving the first image from an image capturing device and to store the first image in an input destination of said memory;
a display control unit adapted to automatically
display a representation of a second image which has been input previously by said image input unit and has already been stored in said memory without an identification mark, and
display a representation of the first image newly input by said image input unit with an identification mark which indicates the newly input status, and keep displaying the representation with the identification mark regardless of whether the displayed representation is selected or deselected by a user; and
a canceling unit adapted to automatically cancel the display of the identification mark by said display control unit without deleting the first image from the input destination of said memory after a reboot process of an image management system which manages the images and is provided with the image display apparatus is performed.

2. An image display method for controlling an image display apparatus, said method comprising:
an image input step of inputting a first image by receiving the first image from an image capturing device and storing the first image in an input destination of a memory;
a display control step of automatically
displaying a representation of a second image which has been input previously in said image put step and has already been stored in the memory without an identification mark, and
displaying a representation of the first image newly input in said image input step with an identification mark which indicates the newly input status, and continuing to display the representation with the identification mark regardless of whether the displayed representation is selected or deselected by a user; and
a canceling step of automatically canceling the display of the identification mark without deleting the first image from the input destination of the memory after a reboot process of an image management system which manages the images and is provided with the image display apparatus is provided is performed.

3. A non-transitory computer-readable recording medium storing a program for causing a computer to perform a method for controlling an image display apparatus, said method comprising the steps of:
an image input step of inputting a first image from an image capturing device and storing the first image in an input destination of a memory;
a display control step of automatically
displaying a representation of a second image which has been input previously in said image input step and has already been stored in the memory without an identification mark, and
displaying a representation of the first image newly input in said image input step with an identification mark which indicates the newly input status, and continuing to display the representation with the identification mark regardless of whether the displayed representation is selected or deselected by a user; and
a canceling step of automatically canceling the display of the identification mark in said display control step without deleting the first image from the input destination of the memory after a reboot process of an image management system which manages the images and is provided with the image display apparatus is performed.

4. An image display apparatus comprising:
at least a processor and memory, functioning as:
an image input unit adapted to input a first image from an image capturing device and store the first image in a first input destination of said memory;
a display control unit adapted to automatically
display a representation of a second input destination in which a second image which has been input previously by said image input unit and has already been stored in the memory without an identification mark, and
display a representation of the first input destination in which the first image newly input by said image input unit is stored with an identification mark which indicates the newly input status, and keep displaying the representation with the identification mark regardless of whether the displayed representation is selected or deselected by a user; and
a canceling unit adapted to automatically cancel the display of the identification mark by said display control unit without deleting the first image from the first input destination of the memory after a reboot process of an image management system that manages the images and is provided with the image display apparatus.

5. The apparatus according to claim 4, wherein said display control unit displays different identification marks when the first input destination is a newly created folder, and when the first input destination is an existing folder.

6. An image display method for controlling an image display apparatus, said method comprising:

an image input step of inputting a first image from an image capturing device and storing the image in a first input destination of a memory;

a display control step of automatically
displaying a representation of a second input destination in which a second image which has been input previously and already stored in the memory is stored without an identification mark, and
displaying a representation of the first input destination in which the first image newly input in said image input step is stored with an identification mark which indicates the newly input status, and continuing to display the representation with the identification mark regardless of whether the displayed representation is selected or deselected by a user; and a canceling step of automatically canceling the display of the identification mark in said display control step without deleting the first image from the first input destination of the memory after a reboot process of an image management system which manages the images and is provided with the image display apparatus is performed.

7. A non-transitory computer-readable recording medium storing a program for causing a computer program to perform a method for controlling an image display apparatus, said method comprising the steps of:

an image input step of inputting a first image from an image capturing device and storing the first image in a first input destination of a memory;

a display control step of automatically
displaying a representation of a second input destination in which a second image which has been input previously and already stored in the memory is stored without an identification mark, and
displaying a representation of the first input destination in which the first image newly input in said image input step is stored with an identification mark which indicates the newly input status, and continuing to display the representation with the identification mark regardless of whether the displayed representation is selected or deselected by a user; and a canceling step of automatically canceling the display of the identification mark in said display control step without deleting the first image from the first input destination of the memory after a reboot process of an image management system which manages the images and is provided with the image display apparatus is performed.

* * * * *